United States Patent [19]

Smith

[11] Patent Number: 5,222,218
[45] Date of Patent: Jun. 22, 1993

[54] SYSTEM WITH DEVICES CONNECTED IN SEQUENCE TO RECEIVE INFORMATION IN A PREDETERMINED ORDER

[75] Inventor: Don Smith, Campbell, Calif.

[73] Assignee: Zilog, Inc., Campbell, Calif.

[21] Appl. No.: 544,520

[22] Filed: Jun. 27, 1990

[51] Int. Cl.[5] .............................................. G06F 13/00
[52] U.S. Cl. ...................... 395/325; 364/242.92; 364/241.1; 364/DIG. 1; 364/935.53; 364/DIG. 2
[58] Field of Search .............................. 395/325, 275; 364/DIG. 1, 242.92

[56] References Cited

U.S. PATENT DOCUMENTS

| | | | |
|---|---|---|---|
| 3,886,524 | 5/1975 | Appelt | 395/325 |
| 3,993,980 | 11/1976 | Moreton | 364/200 X |
| 4,535,330 | 8/1985 | Carey et al. | 340/825.5 |
| 4,621,342 | 11/1986 | Capizzi et al. | 395/325 |
| 4,644,467 | 2/1987 | McCarthy | 395/725 |
| 4,731,737 | 3/1988 | Witt et al. | 395/425 |
| 4,750,111 | 6/1988 | Crosby, Jr. et al. | 395/550 |

Primary Examiner—Michael R. Fleming
Assistant Examiner—Glenn A. Auve
Attorney, Agent, or Firm—Majestic, Parsons, Siebert & Hsue

[57] ABSTRACT

A number of stand-alone devices are connected in a sequence in a predetermined order for reading information from a bus. The devices read information from the bus one at a time and in the predetermined order in response to a signal.

12 Claims, 5 Drawing Sheets

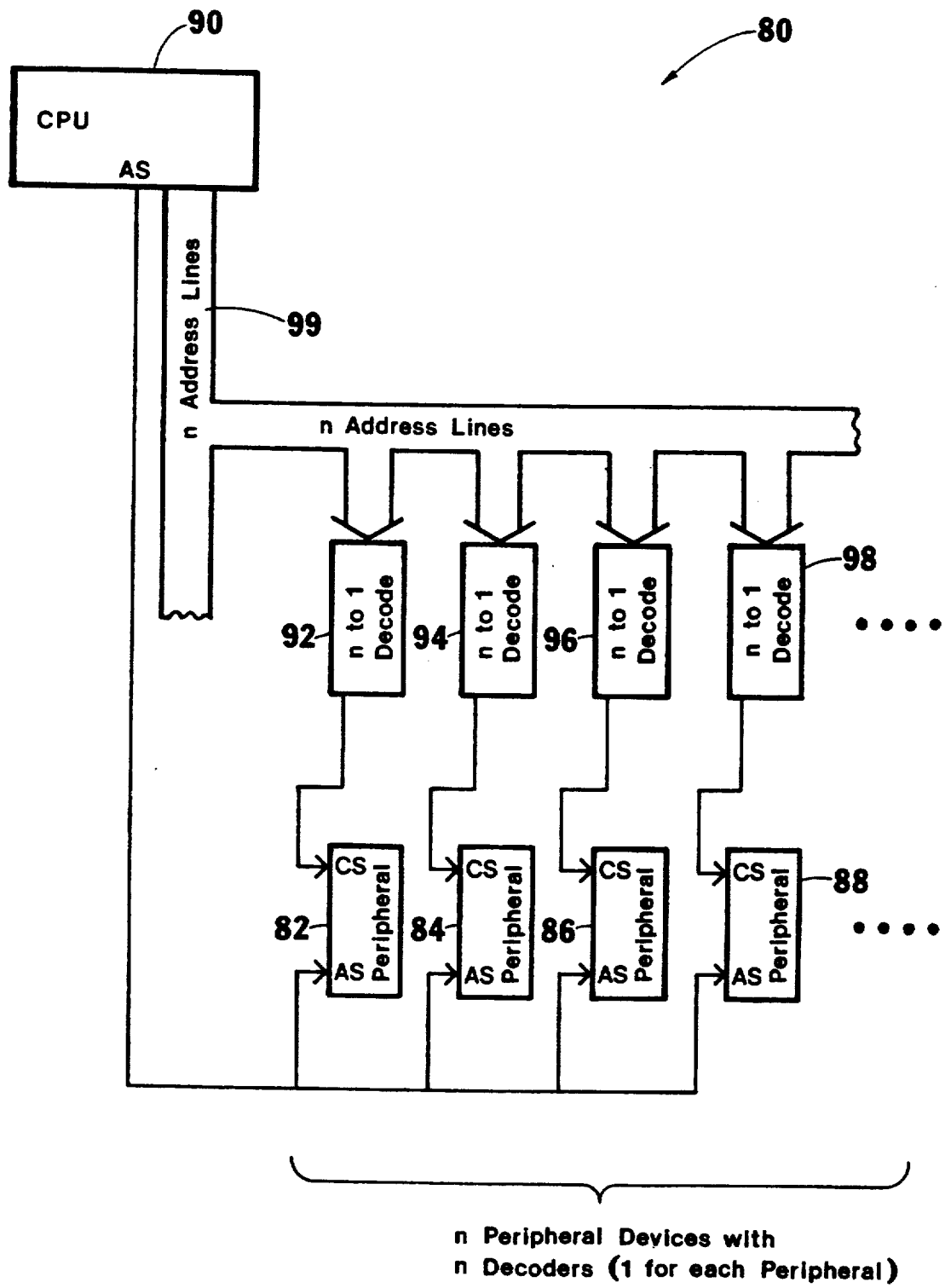
PRIOR ART
FIG._1.

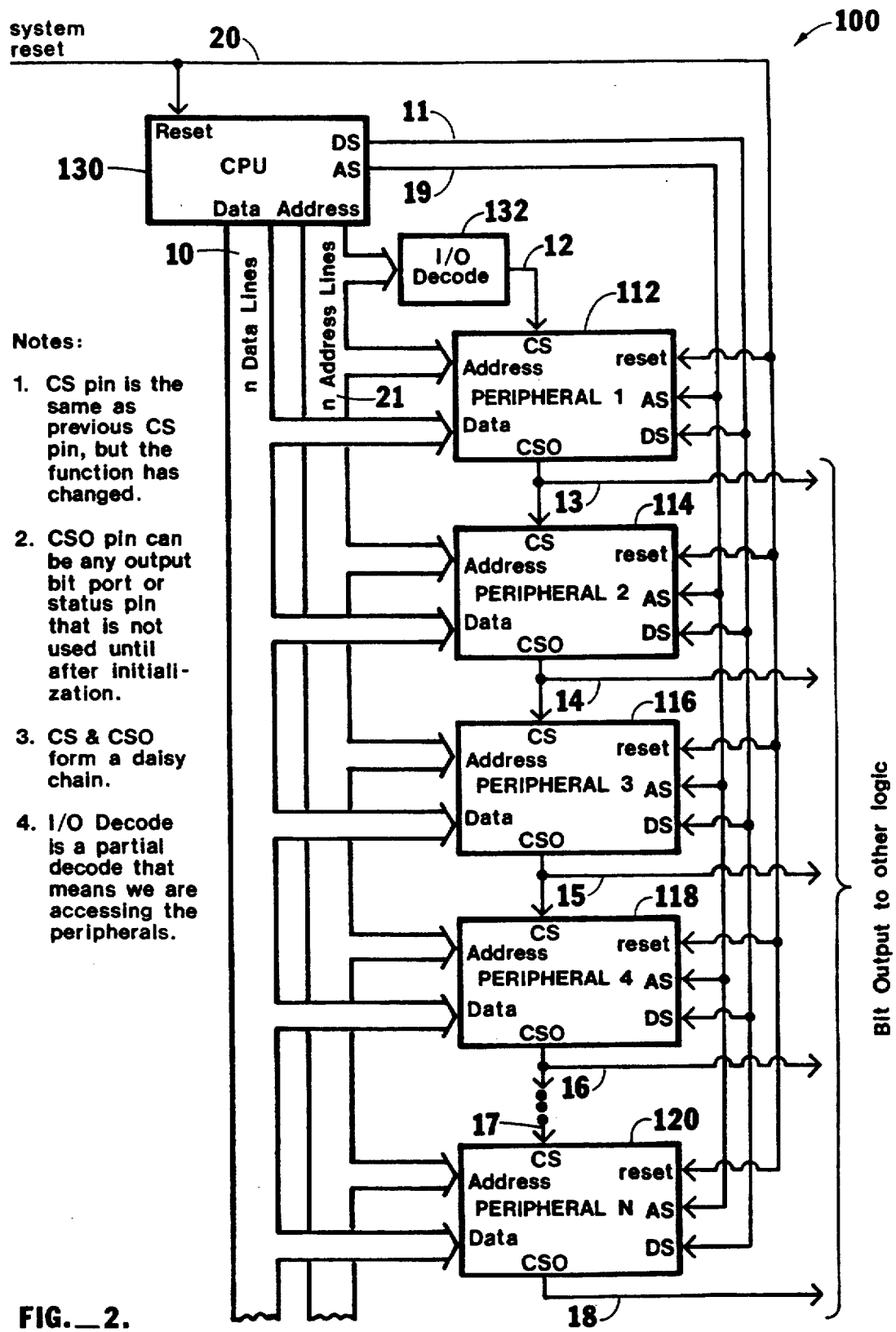
FIG._2.

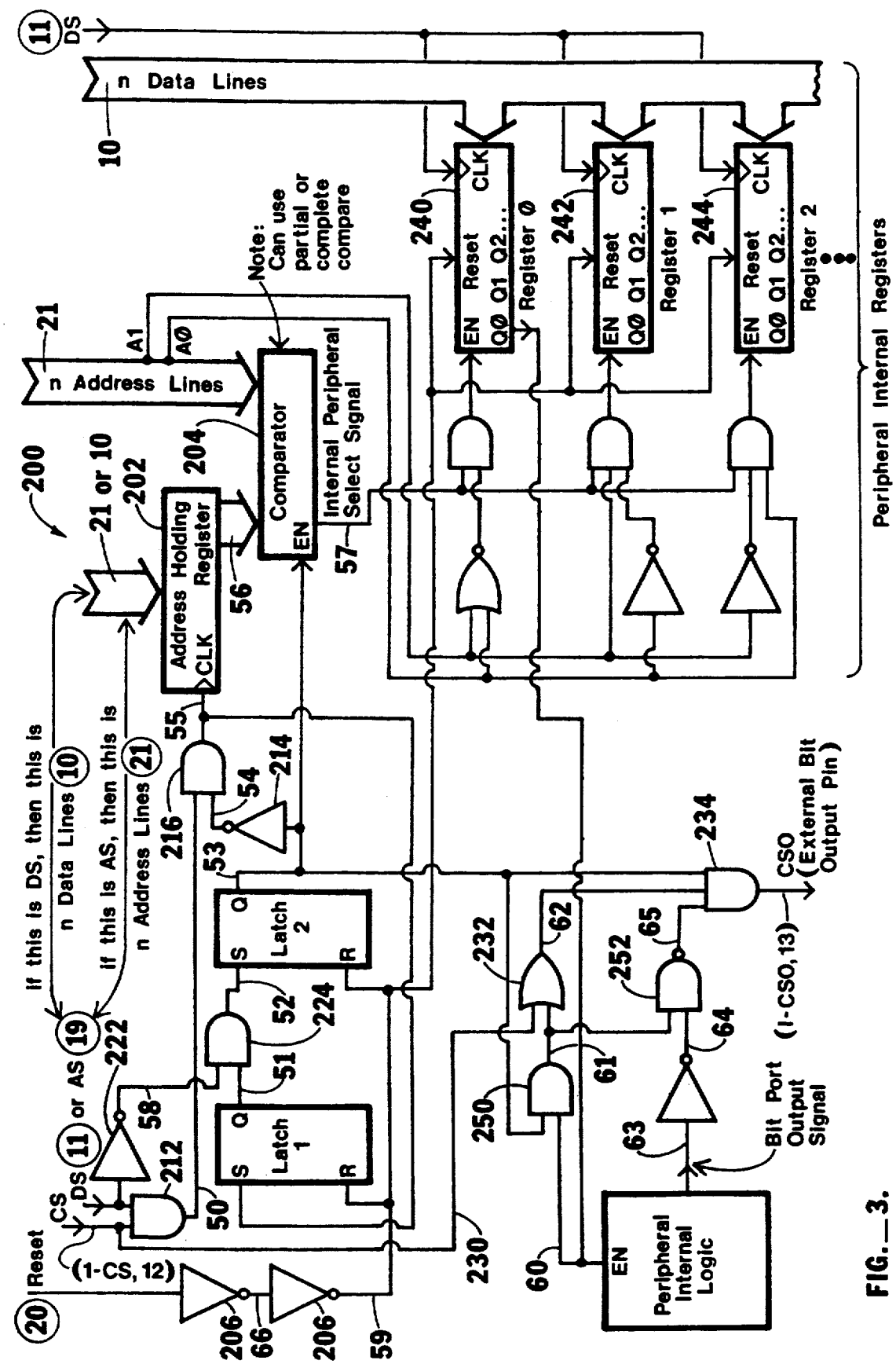
FIG._3.

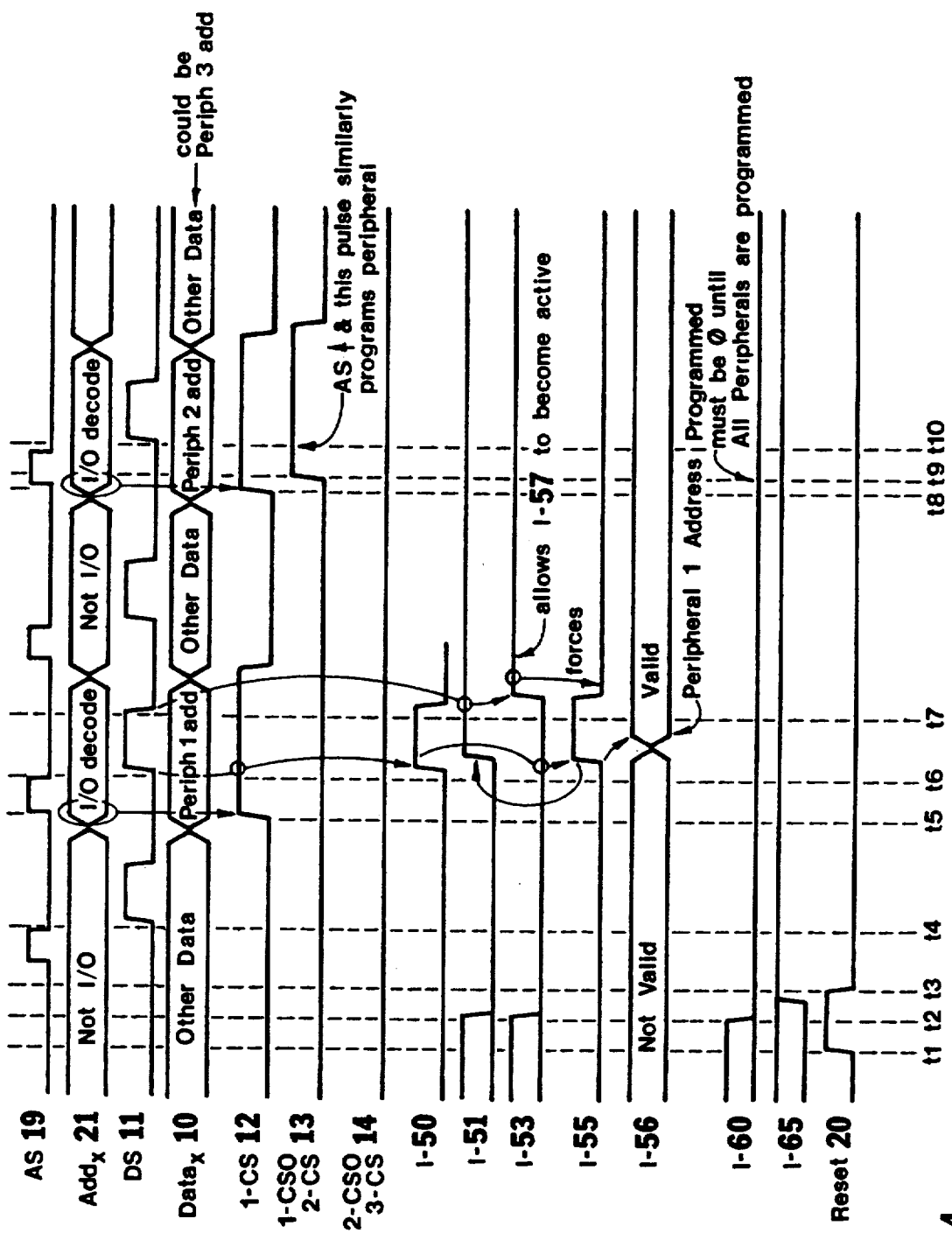
FIG._4.

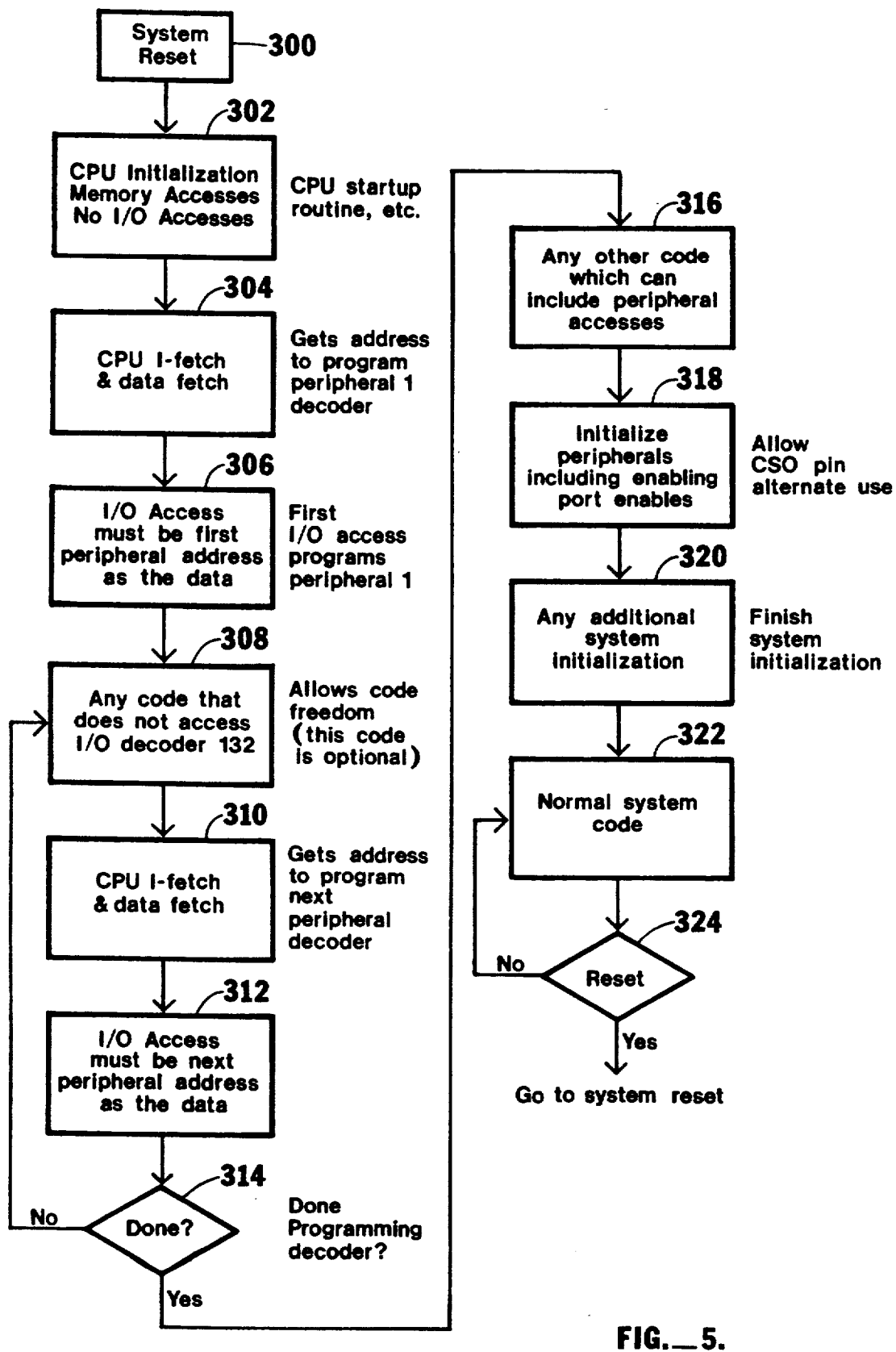
FIG._5.

SYSTEM WITH DEVICES CONNECTED IN SEQUENCE TO RECEIVE INFORMATION IN A PREDETERMINED ORDER

BACKGROUND OF THE INVENTION

This invention relates to a system of a plurality of devices connected in sequence in a predetermined order where the devices are programmable to receive information in the same order as in the sequence. The system is particularly useful for initializing a number of computer peripheral integrated circuit chips.

The computer system may include a number of stand-alone devices, each of which should be initialized before the system is operated. For example, a computer system may include a number of peripherals which should be initialized. Alternatively, a computer system may comprise a number of stand-alone computers connected together to form a network, where each computer should be initialized. In either case, each stand-alone device has to be initialized before the system can operate.

The initialization process typically includes the loading of data into certain registers in the devices in the system. The process is controlled by a central processing unit (CPU) which accesses each of the stand-alone devices by a certain identifying address unique to such device. When the particular device is accessed for initialization, the CPU provides the data destined for the registers of such device on a bus connected to the devices. In conventional systems, each stand-alone device requires a separate address decoder to identify the identifying address from the access codes provided by the CPU onto the bus. Such decoders usually comprise logic gates hardwired to each device to identify a particular identifying address which cannot be later changed or programmed. Where the stand-alone device is implemented as an integrated circuit, that means an address decoder external to the peripheral integrated circuit is required (unless each device itself is hardwired to identify a particular unalterable address, which is even less desirable). Hence each stand-alone device requires a separate address decoder which increases the number of chips required on printed circuit board assemblies. It is therefore desirable to provide a system whereby a single decoder is adequate for allowing the CPU to access all the stand-alone devices for the purpose of initialization.

SUMMARY OF THE INVENTION

The apparatus of this invention is programmable to receive information in response to a first signal. The apparatus comprises a bus for carrying information and a plurality of devices connected in sequence in a predetermined order. The devices read information from the bus in response to the first signal one at a time and in said predetermined order.

BRIEF DESCRIPTION OF THE DRAWINGS

FIG. 1 is a block diagram of a computer system to illustrate a conventional scheme where the identifying address for identifying a number of peripheral devices are hardwired into corresponding decoders.

FIG. 2 is a block diagram of a computer system where the identifying addresses of a number of peripherals are programmable during initialization and where only one decoder is used for loading the identifying addresses into the peripherals to illustrate the preferred embodiment of the invention.

FIG. 3 is a schematic circuit diagram of a portion of the internal peripheral logic in each of the peripheral devices of FIG. 2 to illustrate the preferred embodiment of the invention.

FIG. 4 is a timing diagram to illustrate the functions of the various blocks and circuit elements in FIGS. 2 and 3.

FIG. 5 is a flow chart to illustrate the operations of the system of FIGS. 2-4.

DETAILED DESCRIPTION OF THE INVENTION

FIG. 1 is a block diagram of a CPU connected to a number of stand-alone peripherals to illustrate a conventional scheme for identifying the peripherals. As shown in FIG. 1, computer system 80 includes a number of peripherals 82, 84, 86, 88 (fewer or more peripherals may be included which are not shown in FIG. 1). Before the peripherals can be operated, each of the peripherals has to be initialized. The initialization process is performed by CPU 90. Even during the initialization process, the CPU must be able to identify the peripheral that it is accessing.

The peripherals 82-88 are connected to corresponding n to 1 decoders 92-98 which contain the identifying addresses of the corresponding peripherals. Decoder 92, for example, contains the identifying address of peripheral 82. In conventional systems, decoders 92-98 are simply logic gates hardwired together to identify particular addresses. The CPU provides the identifying addresses on an address bus or lines 99 to the decoders. In order to initialize a particular peripheral, for example peripheral 82, the CPU would provide the identifying address of peripheral 82 on address lines 99. Decoder 92 is such that it identifies only the address of peripheral 82. When the address of peripheral 82 is provided on lines 99, decoder 92 compares such address to the address contained therein and, upon discovering that they are the same, decoder 92 will provide a chip select signal to enable peripheral 82 to be accessed through bus 99 and/or other buses. At this point, the CPU may initialize peripheral 82 by loading its registers with data. The CPU then provides other identifying addresses on the bus to access and initialize other peripherals in the same manner.

FIG. 2 is a block diagram of a system of peripherals and a CPU to illustrate the preferred embodiment of the invention. As shown in FIG. 2, system 100 includes peripherals 112, 114, 116, 118, ..., 120, a CPU 130 and the I/O decode 132. Thus in contrast to the conventional design where each peripheral requires its own decoder, the peripherals in system 100 require only a single decoder 132. In system 100, the identifying addresses of the peripherals are loaded into the peripherals at the beginning of the initialization process. Hence the identifying addresses of the peripherals, unlike the conventional system 80, are not set in stone, but may be changed when desired by programming.

In system 80 of FIG. 1, the chip select signal for each peripheral is derived by its corresponding decoder from the address lines so that the chip select signal for each peripheral is used only for such peripheral and not for other peripherals. In system 100 of FIG. 2, the chip select signal to each peripheral is a signal from decoder 132 or a signal derived therefrom propagating through the peripherals where the peripherals are connected in daisy chain fashion to allow the output of decoder 132 to propagate throughout the peripherals in a predetermined order. The peripherals, the CPU and the decoder are connected by address lines 21. The peripherals and the CPU are also connected by data lines 10, and the CPU provides address strobe (AS), data strobe (DS), and reset signals on lines 19, 11 and 20 respectively to control the operation of the peripherals.

Before the peripherals can be operated, they should first be initialized. First an address unique to each peripheral is loaded into the peripheral where the address loaded into a peripheral is different from the address loaded into all other peripherals. Then after identifying addresses have been loaded into the peripherals, the peripherals may then be readily accessed. Data is loaded into registers of the peripherals and other operations performed to initialize the peripherals. In the discussion below, the above described process of loading the identifying address and loading of data into registers is referred to as initialization. After all the peripherals have been so initialized, the CPU accesses a particular peripheral by placing an address on address lines 21 that matches the address already loaded into such peripheral on data lines 10.

During the initialization process, the peripherals 112, 114, 116, 118, ..., 120 have their identifying addresses programmed in a particular order which is determined by the sequence in which they are connected in a daisy chain. As shown in FIG. 2, they are connected in the order 112, 114, 116, 118, ..., 120. Thus peripheral 112 has its identifying address programmed first, then followed by the programming of the identifying address of peripheral 114 and so on.

To start the initialization process, CPU 130 provides an address to I/O decode 132 which indicates that the peripherals 112-120 are to be initialized. In the preferred embodiment, the address provided to start the initialization process is different from any of the identifying addresses of any of the peripherals. Upon receiving such address and identifying such address as the I/O address, decoder 132 will provide a chip select signal on line 12. Each of the peripherals 112-120 contains internal logic which, together with the control signals from the CPU, would cause all the peripherals to have their identifying addresses programmed in the order 112, 114, 116, 118, ..., 120. The internal logic within the peripherals is described below.

As described above in reference to FIG. 1, the n to 1 decoders are each hard-wired so that the address of the peripheral cannot be changed. The internal logic in the peripherals 112-120, in contrast, are programmable through software and can be changed during initialization by the CPU loading different addresses into the peripherals. In reference to FIG. 3, the identifying address for a peripheral, for example peripheral 112, is stored in an address holding register 202 from data lines 10. Peripheral 112 is therefore readily accessible when the identifying address for the peripheral has been loaded into address holding register 202 of the peripheral. Thus after the loading of the address, peripheral 112 will be accessed when the identifying address of peripheral 112 is provided on address lines 21.

Comparator 204 in internal logic 200 of peripheral 112 compares the address provided on address lines 21 to the identifying address of peripheral 112 stored in register 202. When the two addresses match, comparator 204 provides an internal peripheral select signal on line 57 which is similar in function to the chip select signal in the conventional scheme of FIG. 1. The internal peripheral select signal on line 57 then permits data to be read into registers 240-244 and causes peripheral 112 to be ready for normal operation. To initialize all the peripherals 112-120, the identifying addresses of all the peripherals should be loaded into the address holding registers of these peripherals.

The portion of the internal peripheral logic 200 that performs the function of loading register 202 includes latches 1 and 2 and a number of logic gates appearing in the upper left corner of FIG. 3. The two latches may simply be SR flip-flops. The operation of this process will be discussed in conjunction with the timing diagram in FIG. 4.

Before the identifying addresses can be provided and loaded into the peripherals, the two latches should first be reset to a known state. For this purpose, CPU 130 provides a reset signal on line 20 at time t1. The reset signal, after passing through two inverters 206 functioning as a buffer, appears on line 59. The reset signal on line 59 resets latches 1 and 2 so that the Q outputs of the two latches appearing on lines 51 and 53 will be low at time t2. At time t3, the reset signal falls low; the reset signal does not go high again until the time when the peripherals as a whole group need to be re-initialized.

In reference to FIGS. 2 and 3, during the programming of the identifying addresses, the CPU uses the address lines 21 and AS line 19 to activate the output of the I/O decode line 12 so that the identifying addresses destined for the address holding registers of peripherals 112-120 are supplied through data lines 10 as indicated in FIG. 3. Where the data lines 10 are used to supply the identifying addresses, the data strobe signal DS is used as a timing strobe for loading the identifying addresses. Additionally, when the identifying addresses are loaded via the data lines 10, the address that activates the I/O decode 132 can be completely unrelated to any of the peripheral identifying addresses. This is most useful if the peripheral identifying addresses are not grouped together. For the purpose of illustration, it is assumed that the identifying addresses to be loaded into the address holding registers of the peripherals are supplied through the data lines.

Between time t3 and time t4, the address strobe signal on line 19 goes high. At this time, however, the address provided by the CPU to address lines 21 is still not the valid address for the I/O decode 132, so that the output of decoder 132 on line 12 is still low. In such event, addresses still cannot be loaded into the peripherals by DS line 11 going high at time t4.

At a time slightly before time t5, the CPU 130 provides the address of I/O decode 132 to address lines 21. The address of decoder 132 is chosen by the system designer and is a hard-wired type as in conventional decoders in FIG. 1 discussed above. When the address provided by the CPU to address lines 21 matches the address stored in decoder 132, decoder 132 causes the chip select signal 1-CS on line 12 to go high at time t5 in FIG. 4 when AS line 19 rises.

Since internal peripheral logic 200 is present in all the peripherals, the chip select line is shown in FIG. 3 to receive a generic chip select signal CS. Thus in the internal peripheral logic in peripheral 112, this chip select signal would be 1-CS present on line 12 (see FIG. 2 also). The operation of internal logic within peripheral 112 will now be described in reference to FIG. 3 so that the chip select signal will be referred to as 1-CS on line 12 as noted in parentheses in FIG. 3. Similarly, the generic output CSO in FIG. 3 has been labeled (1-CSO, 13) for the purpose of illustrating the internal peripheral logic in peripheral 112.

At time t6 in reference to FIGS. 3 and 4, since DS line 11 rises, both inputs of AND-gates 212 are high so that its output on line 50 is also high. Since the Q outputs of the two latches have been set to low by the reset signal, inverter 214 causes the input of AND-gate 216 on line 54 to be high beginning at about time t2 and remains high at time t6. Therefore, the output of gate 216 on line 55 goes high at a time slightly after time t6 as shown in FIG. 4. This enables the address holding register 202 to read from data lines 10 the identifying address for peripheral 112 provided by the CPU. Thus after the latches have been reset, the chip select signal 1-CS going high and the rising edge of the data strobe signal on line 11 enable the loading of register 202 as described above.

The signal on line 55 is fed back to the S input of latch 1 and causes the Q output of latch 1 on line 51 to go high as shown in FIG. 4; the Q output remains high until the latch is again reset such as at a time similar to t2. Thus latch 1 stores the event of loading of the register 202 and sets the stage for disconnecting the register from the chip select input on line 12 at a later time.

At time t7, the data strobe signal on line 11 falls low. This causes the output of inverter 222 at line 58 to go high and the output of AND-gate 224 to also go high on line 52 since the Q output of latch 1 at line 51 remains high. This in turn causes the Q output of latch 2 on line 53 to go high. The output of inverter 214 on line 254 is therefore forced low so that the output of gate 216 on line 55 will also be low, cutting off register 202 from the chip select input. Therefore, further changes on the chip select or data strobe inputs will not cause unintended and accidental erasing of the identifying address already loaded into register 202 through lines 10.

The input 12 and output 13 of internal peripheral logic in peripheral 112 are connected by a path through line 230, OR-gate 232, line 62 and AND-gate 234. When peripheral 112 is being initialized, it is necessary to delay the propagation of the chip select signal from line 12 to line 13, so that the identifying address destined for peripheral 112 will not be accidentally loaded into any other peripheral, and data for initializing the registers of peripheral 112 will not be read by other peripherals instead. For this purpose, latch 2 and the gates associated therewith function as a delay means to delay the propagation of the chip select signal from line 12 to line 13 by forcing the output of AND-gate 234 low.

As shown in FIG. 4, the Q output of latch 2 on line 53 is reset to "0" at time t2. This forces the output of AND-gate 234 low, thereby disabling the path from line 12 to line 13. At a time slightly after time t7, line 53 is allowed to go high, thereby removing the constraint between lines 12 and 13 through gate 234. Thus the propagation of the chip select signal to output 13 is delayed by the time period t5 to t7 in FIG. 4, where t5 is the rising edge of the chip select signal 1-CS. At the end of such time period, the Q output on line 53 goes high, thereby enabling comparator 204. Therefore, from approximately time t7 onwards, peripheral 112 is ready to operate. Therefore, if the CPU 130 provides the identifying address for peripheral 112 on address lines 21, upon comparing such address to that in register 202, comparator 204 will provide an internal peripheral select signal on line 57 to operate peripheral 112, which may include the loading of registers 240, 242, 244, . . . While this is possible, in normal circumstances, the CPU will not provide the identifying address for peripheral 112 to lines 21 until after the identifying addresses have been loaded into or read by all the peripherals in the daisy chain.

Peripherals 114-120 also contain internal peripheral logic 200 of FIG. 3 where the chip select inputs and outputs are appropriately labeled. Thus for peripheral 114, the input would be labeled 2-CS on line 13 and the output labeled 2-CSO on line 14 in reference to FIGS. 2 and 3. Thus the two latches in the internal peripheral logic of all the peripherals are reset by the reset signal on line 20 at time t2. As explained above, the propagation of the chip select signal from line 12 to line 13 in peripheral 112 is delayed by latch 2 in the peripheral 112 until time t7, at which point the chip select signal is no longer disabled from propagating to peripheral 114. Thus at a time slightly before time t8, the CPU 130 provides the address of I/O decode 132 on address lines 21 again. AS line 19 going high causes the output of decoder 132 or line 12 to go high. Since line 60 is forced low at time t2 (as explained below), this causes line 61 to be low and line 65 to be high. The signal 12 or 1-CS having gone high at time t8 propagates through peripheral 112 to make chip select signal 2-CS present on line 13 go high at time t9. When the data strobe signal on line 11 again goes high at time t10, this causes the holding register in peripheral 114 to be loaded with the identifying address for peripheral 114 present on data lines 10. In a similar manner, all the peripherals may be programmed in the sequence 112, 114, 116, 118, . . . , 120.

Where the address lines 21 are used to provide the identifying addresses, the above description remains very similar except that the address holding register 202 would obtain the addresses from the address lines and the address strobe signal on line 19 would replace the data strobe signal as the input to gate 212 in FIG. 3. Also in this case, the I/O decode 132 decodes a CPU status that indicates a peripheral access or it decodes the upper part of the address that all of the peripherals have in common. Thus using the address lines 21 to provide the identifying addresses is more limiting than using the data lines 10.

Comparator 204 need not compare the entire address on address lines 21 to the address stored in register 202. In some situations, it would be advantageous to use only the upper portion of the address on lines 21 for accessing a device so that comparator 204 would compare only a portion of the address on lines 21 to that stored in register 202 and the rest of the address would select internal device registers.

As shown in FIG. 2, each of the peripherals has a chip select input and a chip select output. Where the peripherals are implemented as integrated circuits, each peripheral should have a chip select input pin and a chip select output pin. Since the chip select output pin of each peripheral is used in a daisy chain fashion only during the initialization process for loading identifying addresses into the peripherals, it will be desirable to be able to use the chip select output pin as an output pin for the peripheral when the peripheral is not being initialized. This is accomplished by means of a control bit in register 240 and several gates appearing on the lower left corner in FIG. 3.

In reference to FIG. 3, the buffered reset signal on line 59 is applied to register 240 to reset the control bit Q0 to low at time t2 so that line 60 is low. The output of AND-gate 250 on line 61 is therefore forced low which in turn forces the output of NAND-gate 252 on line 65 high at a time slightly after time t2. The output of OR-gate 232 on lines 262 will simply follow the chip select input and gate 252 will effectively isolate the bit port output signal on line 63 from the peripheral output CSO. Therefore, after the peripherals have been reset and while the peripherals are having their identifying addresses programmed, the control bit Q0 being set to "0" has the effect of permitting the propagation of the chip select signal (as long as the path is not disabled by latch 2) and isolating the bit port output signal from the peripheral output at CSO.

After all the peripherals have been programmed (i.e. loaded with identifying addresses), however, the control bit Q0 of register 0 may be set to "1" by the CPU through the data lines 10 and the data strobe on line 11. Since the signal on lines 60 and 53 will be high, line 61 will be high. This has the effect of isolating the chip select input from the chip select output CSO. When line 61 is high, NAND-gate 252 acts essentially as an inverter so that a bit port output signal will appear on line 65. Since lines 62 and 53 are both high, gate 234 simply passes the signal on line 65 to output CSO. The bit port signal is the output signal of the peripheral. In this manner, the bit port output signal generated by the peripheral appears at the CSO output pin, so that the CSO output pin may be used as a regular output pin for the peripheral when the peripheral is not in the initialization mode.

As explained above, the decoders in the conventional system of FIG. 1 contain only certain logic gates configured to recognize only one out of n addresses where such recognizable address cannot be changed by programming. In contrast, the system of FIGS. 2-4 permits the identifying addresses of the peripherals to be changed by the CPU through software means. The system of FIGS. 2-4 is therefore much more flexible and useful than that of FIG. 1.

The programming process using the system of FIGS. 2-4 will now be illustrated in reference to FIG. 5. First, the CPU sends a system reset signal on line 20 to reset the latches and to set the control bit in register 240 to "0" as described above (block 300). The CPU performs a startup routine and other initialization processes such as memory accesses (block 302). At this point, no input/output accesses are made. The CPU then fetches instructions and data (block 304). Where the address fetched is that of the I/O decoder 132 and the data fetched is that of the address of the first peripheral in the daisy chain (i.e., that of peripheral 112), this indicates that the CPU is now ready to program the first peripheral. During this programming process, the input/output access must supply the identifying address of the first peripheral in the daisy chain (block 306) on the data lines 10. At any point when the peripherals are being programmed, the CPU is free to perform any code which does not access the address of the I/O decoder 132 (block 308). This therefore allows the CPU complete freedom except for addressing the I/O decoder only when programming peripheral identifying addresses. The first peripheral therefore reads the identifying address in the manner described above. The CPU then fetches another set of instructions and data (block 310) to program the next peripheral. The next I/O decoder 132 access must be to provide the identifying address for the next peripheral in the daisy chain (block 312). This order of I/O decoder 132 access is the constraint that the CPU must comply with.

The CPU then checks to see if all the peripherals have been programmed (diamond 314). If it has not, it returns to block 308 to repeat the process. If all the peripherals have been programmed, the CPU then performs any other code which can include peripheral accesses (block 316). The peripherals are further initialized, which may include enabling port enables. Thus this includes the setting of the control bit Q0 in register 240 in FIG. 3 to high to permit the CSO pin of the peripherals to be used as a regular output pin when the peripheral is not in the programming mode (block 318). The CPU then performs any additional system initialization to complete the initialization process and then to perform the normal system code (blocks 320, 322). The CPU then checks to see if another reset is called for (diamond 324). If no reset is called for, the CPU returns to block 322 to perform the normal system code. If a reset is called for, the system returns to block 300.

While the invention has been described by reference to a system for programming a number of peripherals, it will be understood that the invention is also applicable to the reading of information into a number of devices arranged in sequence in a predetermined order so that the devices would read the information from a bus carrying the information one at a time and in the predetermined order. As indicated above, the system comprises stand-alone devices which may be computer peripherals or computers connected in a network. Various other modifications may also be made without departing from the scope of the invention which is to be limited only by the appended claims.

What is claimed is:

1. An apparatus programmable to receive information in response to a first signal, said apparatus comprising:

a controller for providing said first signal;

a bus connected to the controller for carrying the first signal and information as controlled by the controller;

a decoder connected to the bus and responsive to said first signal for generating a device select signal;

a plurality of peripheral devices connected in sequence in a predetermined order and connected to the bus and to the decoder, wherein said devices read information from the bus in response to said device select signal, and wherein said devices read information from the bus one at a time and sequentially in said predetermined order, and further the controller supplies an address to the bus to control each of said devices, each of said devices including a storage means for storing said address read from the bus to initialize each of said devices, and each of said devices including a comparator for comparing the address stored in said storage means to an address or a portion thereof subsequently supplied by the controller to the bus.

2. The apparatus of claim 1, wherein each device is a stand-alone semiconductor chip.

3. The apparatus of claim 2, wherein each chip has a chip select pin, and wherein the chip select pin of at least one chip is connected to an output pin of another chip in said predetermined order to form a daisy chain.

4. The apparatus of claim 1, wherein said information read by said devices includes an address for each device so that such device is accessible subsequently by the controller.

5. The apparatus of claim 4, wherein at least one of the devices includes an input and an output, said input receiving said device select signal or a signal derived therefrom defining a second device select signal for enabling the reading of said address from said bus into said at least one device, said output connected to another device downstream from said at least one device in said predetermined order, said input and output connected through a path for propagation of the device select signal or said second device select signal, said at least one device further comprising delay means to delay the propagation of the device select signal or second device select signal through said path to the output for a time period adequate for reading said address into said storage means to initialize such device.

6. The apparatus of claim 5, wherein said at least one device includes means for disabling said path during said time period, so that the device select signal or second device select signal will not propagate to the output during said period.

7. The apparatus of claim 5, wherein said controller supplies addresses to the bus to control said devices, so that when an address or a portion thereof on the bus matches the address stored in the storage means, the comparator generates a device select signal to operate said at least one device.

8. The apparatus of claim 7, wherein each of said devices includes an enabling means for enabling the comparator to perform comparison and to generate said select signal at the end of said time period.

9. The apparatus of claim 5, said at least one device providing an output signal, such device being implemented as a semiconductor chip having an output pin for Ser. No.: 544,520 the output signal, wherein such device includes means for storing a control bit, and wherein said controller changes the value of the control bit to indicate the end of initializing the device, such device further comprising means responsive to said control bit for disabling said path and for applying the output signal to the output pin when the path is disabled, so that the output pin is used in a daisy chain during initialization and as an output pin for the output signal of such device not during initialization.

10. A method for programming a plurality of devices to receive information from a bus, said plurality of devices connected in sequence in a predetermined order and, through said bus, to a controller which fetches instructions and data for controlling the devices, the bus and information on the bus, each of said devices having a designated address, said method comprising:

(a) fetching instructions and data from a source;

(b) when the instructions fetched are for accessing the devices and the data fetched is the designated address of the first device in said sequence, supplying said address to the bus;

(c) writing said address into said first device, wherein the device immediately downstream from the device into which an address is written defines a next device in the sequence;

(d) fetching instructions and data from the source;

(e) when the instructions fetched are for accessing the devices and the data fetched is the designated address of the next device in said sequence, supplying such designated address to the bus;

(f) writing such designated address into said next device;

(g) repeating steps (d) through (f) until designated addresses have been written into all of the devices in said sequence.

11. The method of claim 10, wherein in one or more of the steps (a) and (d) and their repetition in step (g), the instructions fetched are not for accessing the devices, so that the controller is able to perform other functions at such points in time when the devices are being accessed to read information from the bus.

12. The method of claim 10, wherein said information is read by the devices for initialization, said method further comprising the step of supplying signals to one or more of the devices after initialization for operating the devices.

* * * * *

UNITED STATES PATENT AND TRADEMARK OFFICE
CERTIFICATE OF CORRECTION

PATENT NO. : 5,222,218
DATED : June 22, 1993
INVENTOR(S) : Don Smith

It is certified that error appears in the above-identified patent and that said Letters Patent is hereby corrected as shown below:

Column 9, Claim 9, line 34: delete "Ser. No.: 544,520"

Signed and Sealed this

First Day of March, 1994

Attest:

BRUCE LEHMAN

Attesting Officer

Commissioner of Patents and Trademarks